United States Patent
Konstantin

(10) Patent No.: US 8,205,385 B2
(45) Date of Patent: Jun. 26, 2012

(54) DUAL PANEL SYSTEM FOR CONTROLLING THE PASSAGE OF LIGHT THROUGH ARCHITECTURAL STRUCTURES

(75) Inventor: Moshe Konstantin, Highland Park, IL (US)

(73) Assignee: Konvin Associates Ltd., Lake Forest, IL (US)

( * ) Notice: Subject to any disclaimer, the term of this patent is extended or adjusted under 35 U.S.C. 154(b) by 824 days.

(21) Appl. No.: 11/872,572

(22) Filed: Oct. 15, 2007

(65) Prior Publication Data
US 2008/0035275 A1 Feb. 14, 2008

Related U.S. Application Data

(63) Continuation-in-part of application No. 10/600,261, filed on Jun. 20, 2003, now Pat. No. 7,281,353.

(51) Int. Cl.
*E06B 7/096* (2006.01)
(52) U.S. Cl. .............. 49/82.1; 49/77.1; 49/92.1
(58) Field of Classification Search .............. 49/74.1, 49/77.1, 82.1, 92.1
See application file for complete search history.

(56) References Cited

U.S. PATENT DOCUMENTS

| | | |
|---|---|---|
| 14,798 A | 5/1856 | Bruff |
| 153,405 A | 7/1874 | Van Horn et al. |
| 314,393 A | 3/1885 | Paradise |
| 1,520,232 A | 12/1924 | French |
| 2,322,733 A | 6/1943 | Steiner |
| 2,349,470 A | 5/1944 | Stanfield |
| 2,549,167 A | 4/1951 | Brubaker |
| 2,565,979 A | 8/1951 | Michaelsen |
| 3,012,294 A | 12/1961 | Waldor |
| 4,111,183 A | 9/1978 | Haberthier |
| 4,427,048 A | 1/1984 | Osaka et al. |
| 4,435,919 A | 3/1984 | Poisson |
| 4,475,536 A | 10/1984 | Dame |
| 4,573,300 A | 3/1986 | Bezner |
| 4,658,806 A | 4/1987 | Boozer |
| 4,773,733 A | 9/1988 | Murphy, Jr. et al. |
| 4,998,395 A | 3/1991 | Bezner |
| 5,016,390 A | 5/1991 | Johnson |
| 5,052,150 A | 10/1991 | Chen |
| 5,221,363 A | 6/1993 | Gillard |
| 5,348,790 A | 9/1994 | Ben-Zvi et al. |
| 5,405,184 A | 4/1995 | Jardin et al. |

(Continued)

FOREIGN PATENT DOCUMENTS
WO WO 99/66149 A1 12/1999

OTHER PUBLICATIONS
Ward et al., ASM Handbook, vol. 21, 2001, pp. 308-314, Eqn 17.

*Primary Examiner* — Jerry Redman
(74) *Attorney, Agent, or Firm* — Drinker Biddle & Reath LLP

(57) ABSTRACT

The invention comprises improvements to transparent/translucent panel systems including two spaced flat panels and a series of elongated, abutting, rotatably mounted transparent/translucent light-controlling members disposed between the panels in which the light-controlling members are at least partially tubular or have annular members along their length to facilitate rotation of the light-controlling members and include a light-blocking surface including improvements to ensure continued efficient operation when the panel systems are subjected to flexure or deflection and possible permanent deformation.

18 Claims, 16 Drawing Sheets

U.S. PATENT DOCUMENTS

| | | |
|---|---|---|
| 5,469,658 A | 11/1995 | Digianni et al. |
| 5,507,547 A | 4/1996 | Hattass et al. |
| 5,564,229 A | 10/1996 | Noska |
| 5,600,920 A | 2/1997 | Roy |
| 5,608,990 A | 3/1997 | Kyle |
| 5,895,701 A | 4/1999 | Givoni |
| 5,918,417 A | 7/1999 | Kinder |
| 6,015,002 A | 1/2000 | Biro et al. |
| 6,085,825 A | 7/2000 | Swink et al. |
| 6,134,842 A | 10/2000 | Cheng et al. |
| RE36,976 E | 12/2000 | Bezner |
| 6,164,024 A | 12/2000 | Konstantin |
| 6,314,680 B1 | 11/2001 | Buckwalter et al. |
| 6,499,255 B1 | 12/2002 | Givoni |
| 6,778,578 B2 | 8/2004 | Lee et al. |
| 6,807,772 B2 | 10/2004 | Halter |
| 6,978,578 B2 | 12/2005 | Givoni |
| 7,281,353 B2 * | 10/2007 | Konstantin .................. 49/82.1 |
| 2004/0256000 A1 | 12/2004 | Konstantin et al. |
| 2006/0288645 A1 | 12/2006 | Konstantino et al. |

* cited by examiner

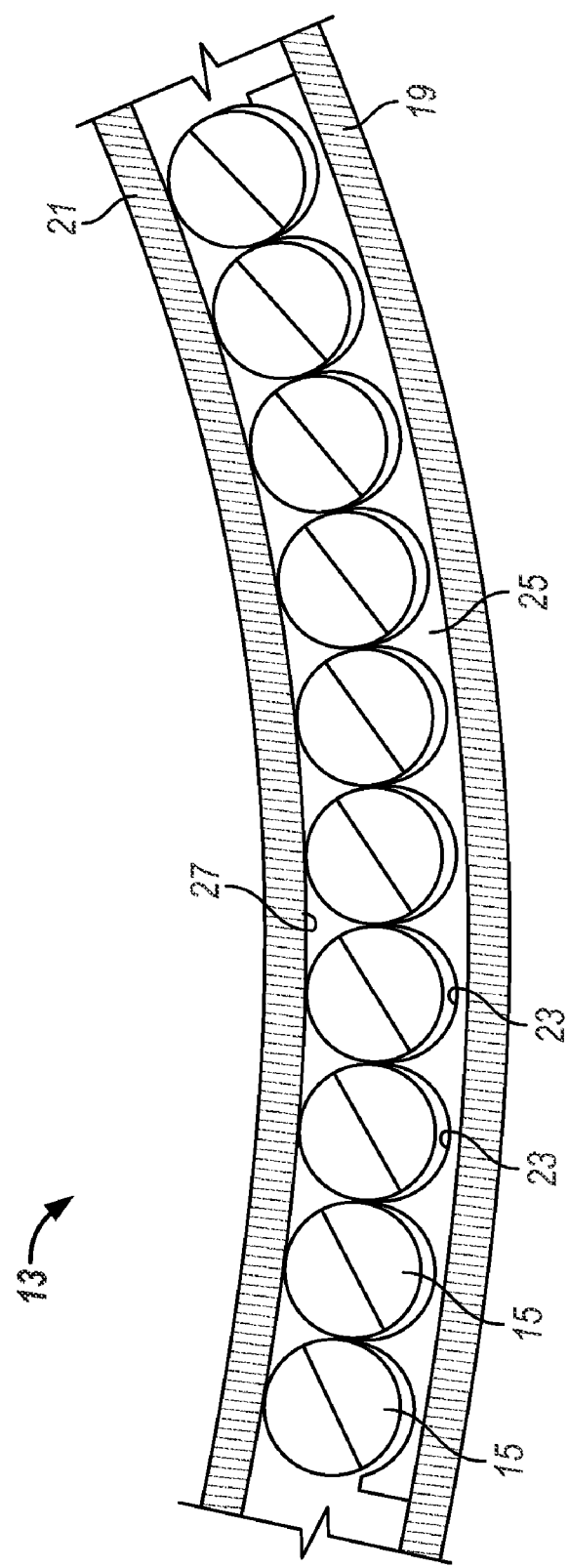

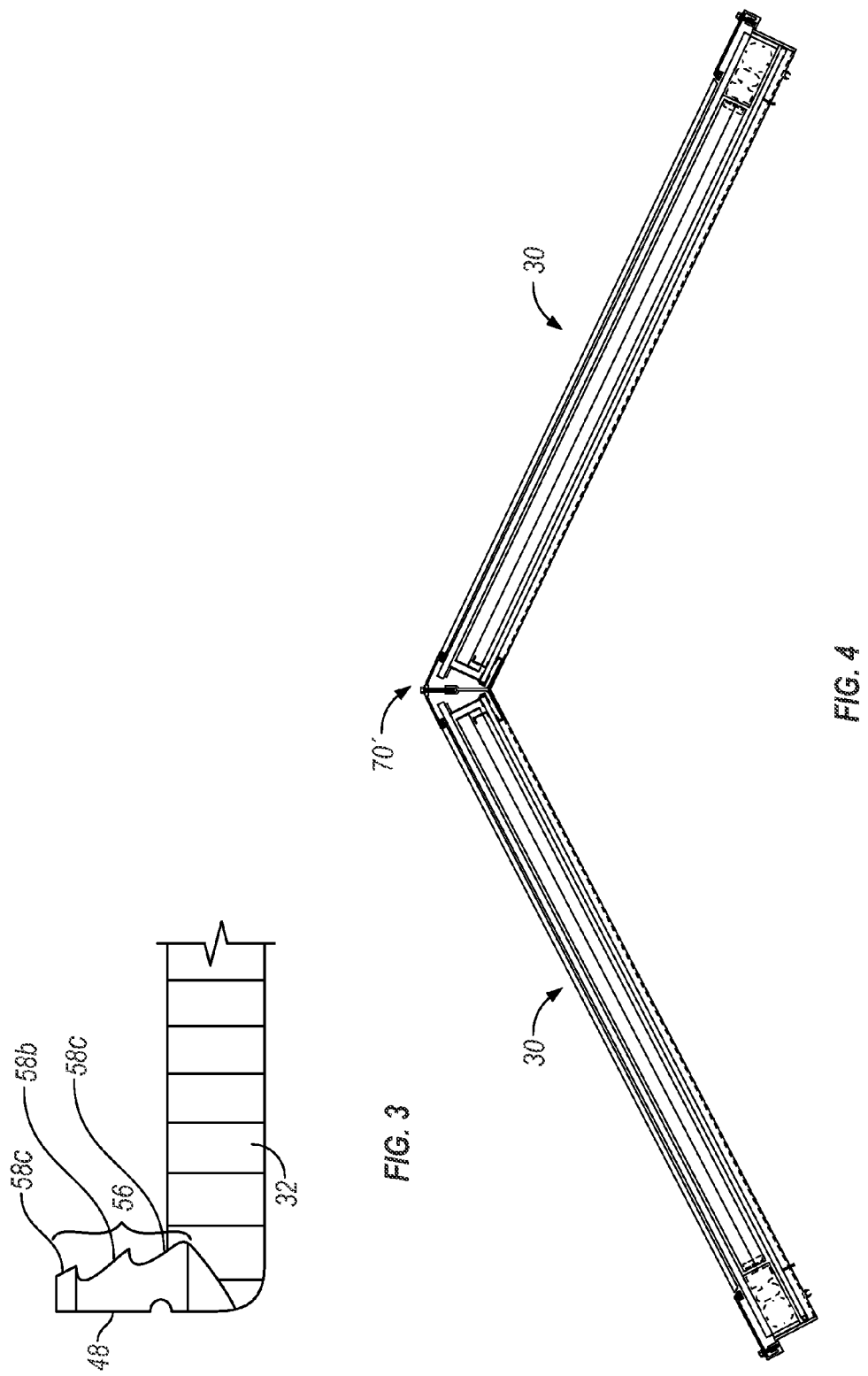

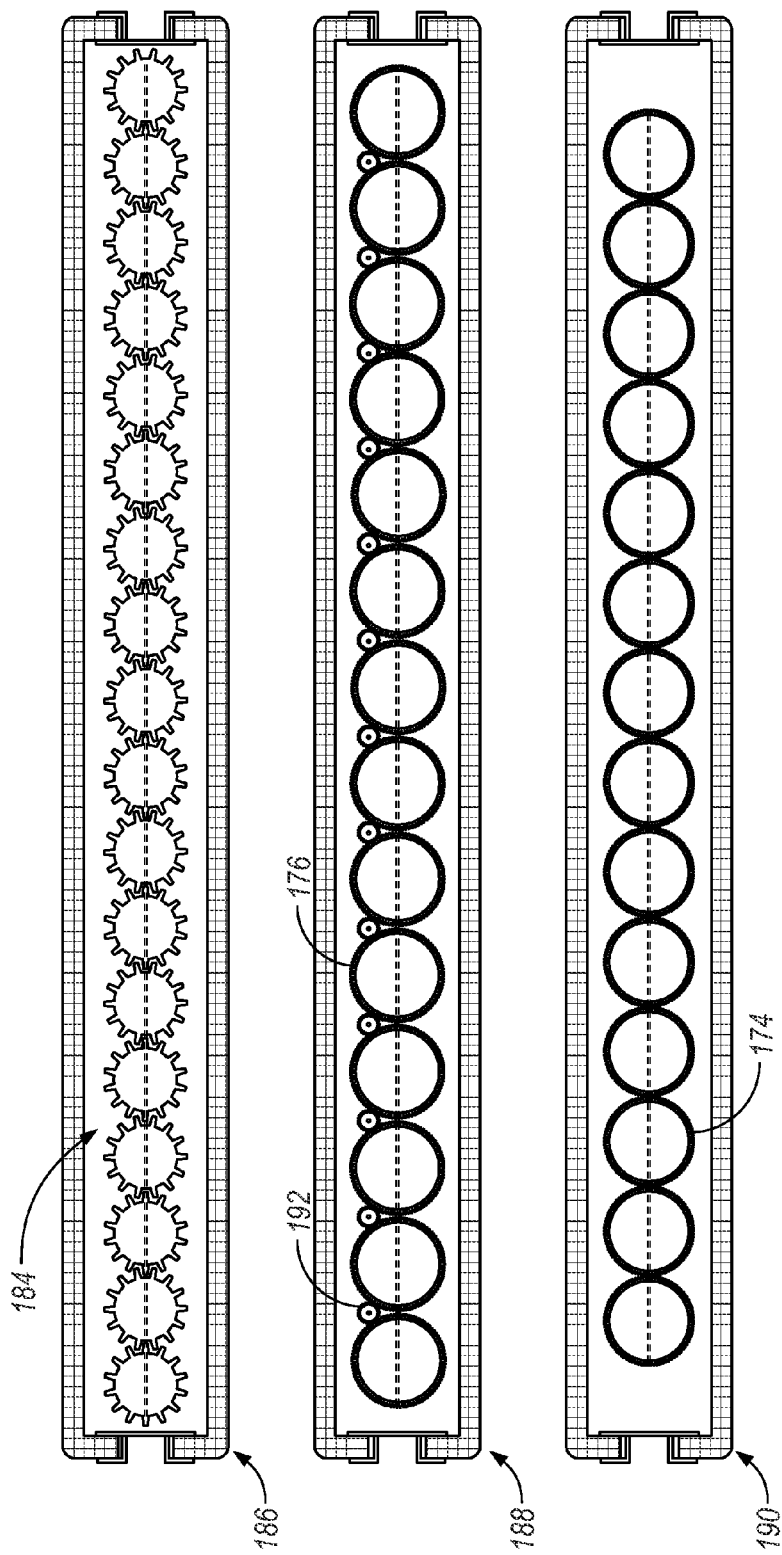

DUAL PANEL SYSTEM FOR CONTROLLING THE PASSAGE OF LIGHT THROUGH ARCHITECTURAL STRUCTURES

This application is a continuation-in-part of U.S. patent application Ser. No. 10/600,261, filed Jun. 20, 2003, which issued as U.S. Pat. No. 7,281,353 on Oct. 16, 2007. The entire disclosure of the foregoing patent application is hereby incorporated by reference.

FIELD OF THE INVENTION

This invention relates to transparent/translucent panel systems for controlling the level of light admitted through sloped glazing, skylights, roofs, walls, and other architectural structures designed to pass light and, more particularly, to improvements in the structure of such systems to ensure continued reliable operation when the panel systems are subjected to flexure or deflection due to loading.

BACKGROUND OF THE INVENTION

Various types of transparent and translucent glazing systems are available for the construction of sloped glazing, skylights, roofs, walls, and other architectural structures designed to pass light for daylighting interiors and other purposes. When using such glazing systems, it is often desirable to optimize the system's shading coefficient by reducing solar heat gain on hot summer days and during peak sunlight hours year round, while providing maximum light on cold winter days and when it is most needed. It is often necessary to minimize glare and direct sunlight at peak sunlight periods, in order to ensure comfort of those who occupy the space exposed to the glazing system. If architects and space planners can be liberated from the constraints of fixed light transmission, they can maximize interior daylight without the burden of unmanaged heat gain or discomforting glare.

Indeed, if the level of light passing through sloped glazing, skylights, roofs, walls, and other architectural structures designed to pass light can be simply and efficiently controlled, it will enable architects and space planners to design more efficient HVAC systems, by reducing or maximizing heat gain during those limited periods that require peak HVAC system performance and consequently reducing air conditioning and heating capacity requirements. Instead of investing in expensive over-capacity equipment to handle the limited excessive sunlight and cold days in any given year, the architects and space planners can rely on the glazed panel to reduce the peak demand times and therefore the maximum HVAC load capacity.

The known approaches to controlling the amount of light admitted through glazing systems, however, are limited and are generally difficult or expensive to construct and service. There is therefore a substantial need for a flexible, inexpensive, reliable and readily serviceable system for achieving this purpose.

Prior approaches to controlling the level of light passing through architectural structures have been of only limited usefulness. For example, louver blind assemblies using pivoting flexible members operable inside a chamber formed by a double-glazed window unit have been suggested for this purpose. Such louver blinds require substantial support of the flexible members which, additionally, must be controlled from both their distal and their proximal ends. Furthermore, louver blinds are difficult and expensive to assemble, apply, operate, maintain and replace, and cannot be readily adapted for use in non-vertical applications or in applications in which it is either desirable or necessary to control the flexible members from only one end.

U.S. Pat. No. 6,499,255 provides another, more recent approach to addressing this challenge. The '255 patent describes a unitary transparent or translucent panel of controllable radiation transmissivity comprising a plurality of rotatably-mounted radiation-blocking tubular members having at least one portion that is substantially opaque and means for rotating the radiation-blocking members to block out varying amounts of the radiation striking the panel by varying the area of the opaque portions presented to the incoming light. It is key to this structure that the radiation-blocking members be mounted in a series of adjacent segregated elongated tubular cells which make up the unitary panel.

While the unitary panel described in the '255 patent represents an important advance in the art, it has some shortcomings. For example, adjacent tubular members cannot abut each other due to the intervening walls of the tubular cells. Thus, when the tubular members are in the fully closed position, light still passes through the clear or translucent material of the unblocked cell walls between the adjacent radiation-blocking members. Also, if a tubular member fails, the entire panel must be removed and replaced. This may be prohibitively complex and expensive in certain applications. Where the panels are part of a protected enclosure, removal of an entire panel will expose the interior of the enclosure to the exterior environment which can be particularly problematic.

Additionally, in the design of the '255 patent the diameter of the radiation blocking members is constrained by the size of the cells—where circumstances make larger or smaller radiation-blocking members desirable or necessary due to economic or other reasons, the system of the '255 patent cannot accommodate them. For example, the maximum cell size available following the teaching of the '255 patent is 30 mm×30 mm due to manufacturing constraints in extruding the panels. Thus, a panel width of 1 meter by 30 mm in thickness or depth will require 33 tubular members as well as 33 related driven mechanisms which extend beyond the end of the panel. This is a very complex and expensive design which could be made substantially simpler and less expensive if the same result could be achieved with fewer larger diameter radiation-blocking members or with simpler drive mechanisms that preferably could be substantially contained within the area defined by the panel. Furthermore, the unitary cellular panel structure of the '255 patent resists bending, making it difficult to use the system in architectural applications where tight radius bends are required. Additionally, the cellular-panel structure has insulation, soundproofing and structural limitations arising from its maximum 30 mm thickness or depth that make its use less than ideal in applications calling for high insulation values, substantial soundproofing or long span construction. Finally, the unitary cellular panel structure of the '255 patent does not permit the use of different combinations of interior and exterior panel colors and finishes as required or desirable in many architectural applications.

One promising approach to overcoming the shortcomings of the panel system of the '255 patent is described in U.S. Pat. No. 7,281,353 to the present inventor in which, inter alia, adjacent elongated tubular light-controlling members are rotated by means of contacting engagement surfaces. In one embodiment of the '353 patent, the tubular light-controlling members are supported for rotational movement within scalloped surfaces in carriage members. Thus, prior to the advent of the present invention it was thought to be necessary to confine individual light-controlling members either in elongated cells as in the '255 patent or in individual scalloped openings as in the '353 patent.

These prior approaches, however, have a number of drawbacks. First, as noted above, there are serious shortcomings in terms of assembly, replacement, etc. in the use of elongated panel cells in the panel system of the '255 patent. While certainly less problematic, there are also structural and assembly challenges in respect of the alignment of the elongated light-controlling members and carriage member scallops in the panel system of the '255 patent. However, perhaps more importantly, such systems may in certain environments encounter loads due to high winds and ice and snow which cause the panel systems to flex or deflect and even permanently deform. Also, temperature differentials between outer panel members that are exposed to varying outdoor temperatures and inner panels that are exposed to varying indoor temperatures may cause flexure or deflection and possibly permanent deformation. This movement away from an initial generally flat panel system can bring about binding between light-controlling members and cell surfaces in the '255 patent system and binding between light-controlling members and scallop surfaces and/or panel surfaces in the '353 patent. The conventional approach to dealing with flexure has been to incorporate large, expensive and heavy cross-members in order to severely limit flexure. See, e.g., upper cross-members 9 of U.S. Pat. No. 6,978,578. These cross-members also typically must be made of a rigid material like extruded aluminum which blocks light transmission and therefore is aesthetically undesirable.

BRIEF SUMMARY OF THE INVENTION

It is one objective of this invention to provide a transparent/translucent panel unit in which the transmission of light across the system can be adjusted from almost full transparency or translucency to near total opacity while avoiding binding due to flexure or deflection and possible permanent deformation of the unit due to wind, snow and ice loads or due to differential expansion of the panels or sheet that comprise the panel unit. This is accomplished in an elegant manner which does not limit flexure or deflection as in the conventional approaches, but instead modifies or adapts contact surfaces to minimize friction and abrasion and adjusts system parameters to alleviate interference due to flexure and deflection.

Thus, in one embodiment of the invention, two generally parallel spaced flat panels or sheets and a series of elongated, transparent/translucent light-controlling members are disposed between the panels and mounted for rotation about their longitudinal axes. The spacing between the flat panels $D$ is determined by taking into account the span $s$ of the panels, the deflection factor $d$ and the maximum height $h$ of the light-controlling members. Allowable deflection when subjected to load is defined as $s/d$ by building codes such as the International Building Code (IBC), Structural Engineering codes such as AISC, Aluminum Design manual such as the American Aluminum Associations or specifications as provided by material suppliers for continuous performance under load. "d" is a factor related to the type of material and application. For example, as applicable here, $d=20$ for plastics, $d=180$ for glass and $d=60$ for aluminum. Thus, the present invention requires in one embodiment that the span of the panels and the deflection factor of their material satisfy the formula $s/d+h+f<D$, where "f" is a tolerance chosen to accommodate material variations and to ensure safe clearance. The preferred tolerance which will be between about 1-20 mm.

Once installed, the light-controlling members as well as other components housed between the panels can be readily accessed by removing one of the two parallel panels, leaving the second panel in place to protect areas enclosed by the panel system from exposure to the outside environment. Additionally, in one preferred embodiment of the invention, the light-controlling members may be positioned in abutting relationship to maximize the effectiveness of the system in blocking incoming light when the panel system is in the fully closed position.

Rotation of the light-controlling members may be by the application of rotary motion at one end (or less preferably at both ends) of each light-controlling member. The rotary motion may be applied to a plurality of the light-controlling members directly, as described, for example, in the '255 patent, or it may be applied indirectly. Thus, in one particularly important aspect of the invention, circular engagement surfaces are provided on adjacent light-controlling members. This enables the plurality of light-controlling members within a panel unit to be rotated by imparting rotary motion either manually or with a motorized drive to at least one of the light-controlling members which transmits the rotary motion indirectly across the contacting engagement surfaces of adjacent light-controlling members to rotate the light-blocking surfaces and vary the level of light passing through the panel unit. Also, the use of two spaced-apart panels (rather than a unitary panel as in the '255 patent) makes it possible to house some or substantially all of the drive mechanism between the panels and thus within the panel unit, out of the way of other structural components.

It is another objective of this invention to provide alternative efficient, economic means for supporting and maintaining light-controlling members in panel units having spaced flat panels or sheets in ways not heretofore thought possible.

The panel units of the present invention can maintain a perfect balance between light transmission and thermal performance, fostering a daylighted, comforting, livable and productive environment all year long without concern over flexure or deflection and possible permanent deformation of the panel units of the system. They also conserves energy on peak demand. The panel units may be fully automatic, with built-in intelligent light controllers and an embedded program that senses the daylight outside and manages the level of light and solar heat gain inside based on the level of sunlight outside. This will enable users to control natural daylight and comfort levels in any space all day long, and all year long, simply by setting desired light levels.

BRIEF DESCRIPTION OF THE DRAWINGS

The features of this invention which are believed to be novel are set forth with particularity in the appended claims. The invention, together with its objects and advantages, may be best understood by reference to the following description, taken in conjunction with the following drawings, in which like reference numerals identify like elements in the several figures, and in which:

FIG. 1A is a diagrametric representation of a prior art panel unit under loading such as a wind load or a snow load;

FIG. 3 is an enlarged partial front elevation view of one panel joining flange which may be used with the present invention;

FIG. 4 is a front elevation view of adjacent panel units angled with respect to each other to form a roof ridge;

FIGS. 19 and 20 are representations of three alternative means for transmitting motion across adjacent light-controlling members.

DETAILED DESCRIPTION OF THE INVENTION

Figure 1:
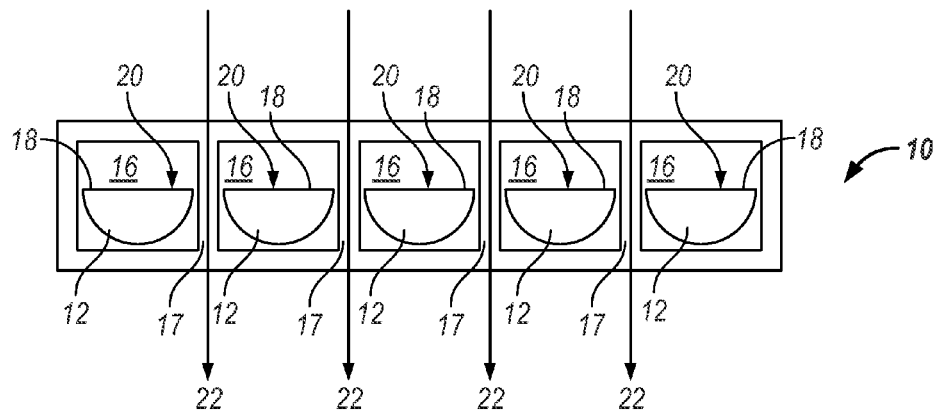
FIG. 1 is an elevational view of a portion of a prior art panel in accordance with the teaching of U.S. Pat. No. 6,499,255.

Turning first to FIG. 1, an elevational view of a transparent or translucent panel 10 in accordance with the teaching of prior U.S. Pat. No. 6,499,255 is shown. Panel 10 includes a series of half-cylinder louvers 12 rotatably mounted in a series of adjacent, segregated cells 16 separated by walls 17. Louvers 12 each have an opaque top surface 18. Thus, in the illustrated embodiment where the louvers are in the fully closed position, light rays 20 strike opaque surfaces 18, which block light transmission through the louvers. Unfortunately, the transparent or translucent material in the walls 17 between adjacent cells remains unblocked, which means that light rays 22 will penetrate the panel through these walls. Thus, even with all of the louvers in the fully closed position, the panels of the '255 patent admit light: in one commercial embodiment of this invention, the panels have been found to admit a minimum of about 6% light transmission. Also, the panel of the '255 patent consists of one integral, hollow core, multi-cell panel with inserted radiation-blocking members in the cells, which means that serviceability and maintenance options are limited.

FIG. 1A is a diagrammatic representation of a panel unit comprising a series of cylindrical light-controlling members 15 positioned between panels 19 and 21 and resting in a series of scallops 23 in a supporting member 25. As shown in an exaggerated form for purposes of illustration, panel unit 13 is deformed under a snow, wind or other load on top of panel 21 (not shown) causing scallops 23 to be squeezed together thereby pushing up on the light-controlling members that press against undersurface 27 of top panel 21 which can cause binding of the light-controlling members making light adjustment difficult or impossible. Also, even in the absence of sufficient closure of the scallops to drive the light-controlling members upward, the load and resulting downward flexure of the top panel may cause binding of the light-controlling members making light adjustment difficult or impossible. Furthermore, the carriage may permanently deform under load unless properly sized for the required span and, indeed, for larger spans the required size of the carriage may become overly large and therefore impractical.

The panel systems of the present invention are referred to as being transparent/translucent. It is intended to mean by this that the panel systems range from transparent (transmitting light rays so that objects on one side may be distinctly seen from the other side) through translucent (letting light pass but diffusing it so that objects on one side cannot be clearly distinguished from the other side). Also, the panel systems may be tinted. Typical tinting colors include white, bronze, green, blue, and gray, although other colors may be used. Further, the panels may have a matte finish. Finally, combinations of different top and bottom panels may be used, such as clear/clear, white/clear, clear/white, bronze/clear, green/clear, green/white, bronze/white, white/white, etc.

Also, when reference to "light" is made in the description of the present invention, it should be construed to include the spectral range of visible light as well as electromagnetic radiation below and/or above that spectral range.

Figure 2A:
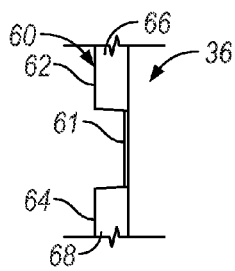
FIG. 2A is a partial enlarged view of the spacer rails of FIG. 2.
Figure 2B:
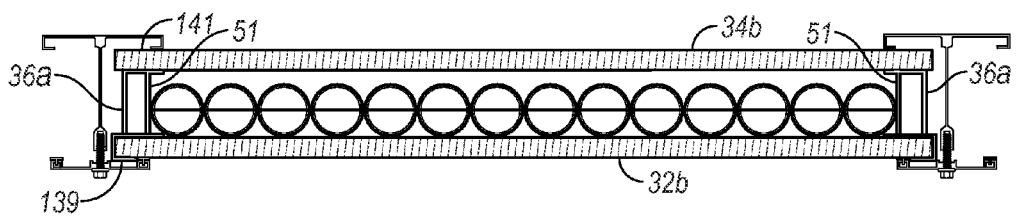
FIGS. 2B and 2C are elevational views of alternate panel-joining arrangements in accordance with the invention.
Figure 2C:
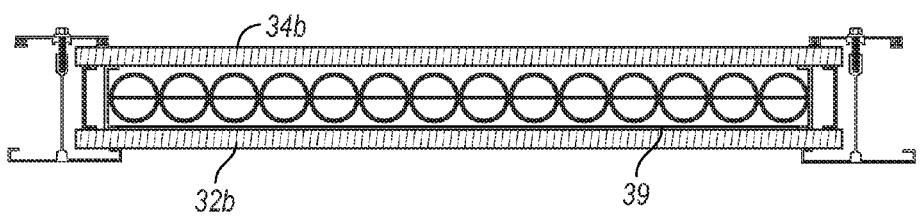
Figure 2:
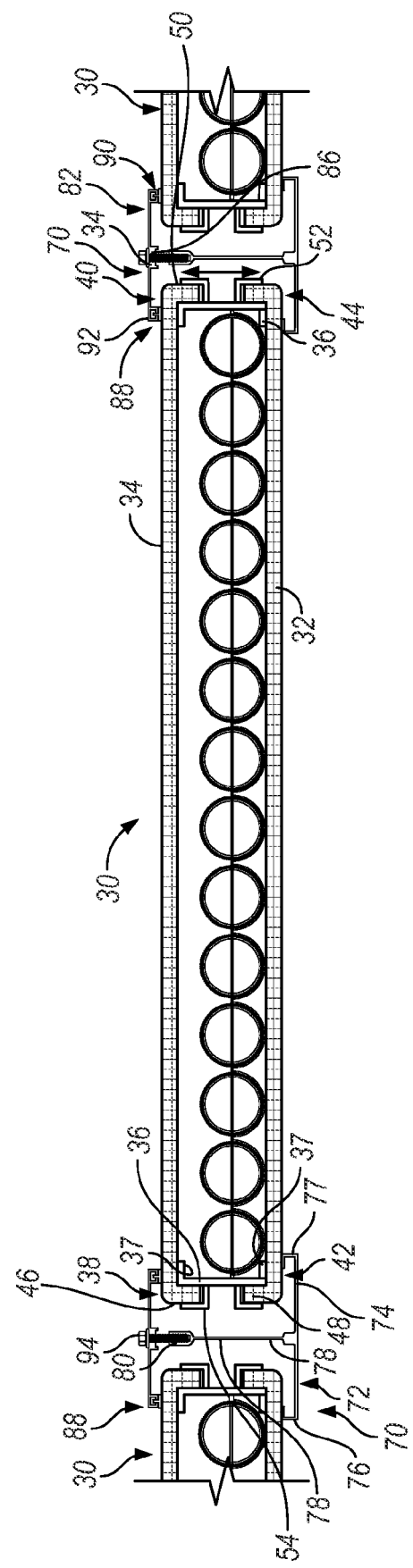
FIG. 2 is a front elevation view of a panel unit in accordance with the present invention, attached to adjacent panel units which are shown in part.

Turning now to FIG. 2, a panel system unit 30 in accordance with the invention is shown consisting of two generally flat transparent/translucent panels, including an interior panel 32 and an exterior panel 34. Panels 32 and 34 are generally parallel and are separated by elongated spacer rails 36 with top and bottom ledges 37 which extend along the lateral edges 38, 40, 42 and 44 of the interior and exterior panels. In an important embodiment of the invention, spacing must satisfy the unique requirements of the invention regarding span, deflection and light-controlling member height as described below. While panels 32 and 34 may be of any desired span, currently preferred spans are 24, 48 and 60 inches. Also, while the panels may also be any desired length, it is currently intended that panels about 2 feet to 60 feet in length will be used.

The lateral edges of the panels may be provided with respective panel joining flanges 46, 48, 50 and 52 for conveniently assembling the panels together. In one such panel-joining arrangement, the flanges each have a smooth outer face 54 and an inner face 56 with tooth-like detents 58a-58c (FIG. 3), whose function will be explained below. A similar joining flange structure is described, for example, in U.S. Pat. Re. 36,976, the contents of which are incorporated herein by reference. Also, panels with different panel joining flange designs and other panel-joining arrangements may be used.

As seen best in FIG. 2A, spacer rails 36, in turn, each have an outer bracket 60 shaped as shown, to provide a middle attachment section 61 and offset ends 62 and 64. The brackets are attached to the outer surface of each of the spacer rails by conventional means, with attachment section 61 centered along the rails, thereby defining top and bottom channels 66 and 68 between the outer surface of the spacer rails and the inner surface of the bracket. The channels are dimensioned to accept flanges 48-52 in a tightly fitting manner to firmly and sealingly join the panels under an elastic deformation of the detents. Thus, when the panels are pressed home to assemble the panel system unit with the inner surfaces of panels 32 and 34 abutting ledges 37, there is resistance to removal of either of the panels from these channels. If and when a repair is needed, it is necessary only to release one corner of the panel flange with an appropriate tool, and then continue to zip it along the length of the panel to release the entire panel. The panel can be reinstalled after the repair is completed by again pressing the panels home to seat the panel flanges in the channels.

An alternate panel-joining arrangement is depicted in FIG. 2B. In this embodiment, internal and external panels 32a and 34b may be any appropriate sheet material. The sheets are held together in this embodiment by retainers 36a which extend along the opposite lateral edges of the sheets. Retainers 36a include two channels 139 and 141 in which the lateral edges of the sheets snugly rest and a spacer 51 carrying the flanges at the desired sheet spacing of the panel system. The retainers preferably are made of aluminum or of another metal which either inherently resists corrosion or is treated to resist corrosion.

Any number of fully assembled panel units 30 can be joined to adjacent panel units to achieve the panel system width called for in a particular application. Adjoining panel units may be fixed to each other using a clamping system 70. This clamping system includes a bottom member 72 with a base 74 and elongated bottom pedestals 76 and 77 along each lateral edge of the base. An upstanding bracket 78 along the center of the base with a series of screw thread-receiving apertures 80 along its length. Clamping system 70 also includes a top member 82 with an upstanding reinforcing strip 84 along its center and a series of screw-receiving apertures 86 running along the strip. Along each lateral edge of the top portion, a pair of elongated top pedestals 88 and 90 are provided with apertures for receiving resilient sealing gaskets 92.

In order to join the adjacent lateral edges of the panel units, the clamping members may be positioned as illustrated, with elongated bottom pedestals 76 and 77 abutting the exposed surface of the interior panels and sealing gaskets 92 of top pedestals 88 and 90 abutting the top surface of the exterior panels. A series of screws 94 spaced, for example, at intervals of about 8-16 inches, are passed through the apertures 86 and into the thread-receiving apertures 80, and screwed home to lock the clamping member together and seal the connection from outside elements.

Figure 5:
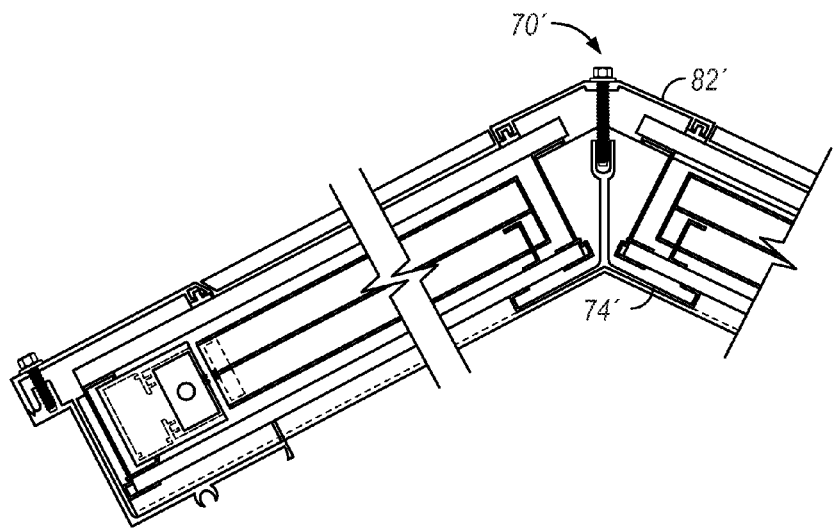
FIG. 5 is a partial enlarged view of a portion of the structure illustrated in FIG. 4.

FIGS. 4 and 5 illustrate an alternate application of the invention where adjacent panel units are angled with respect to each other to form a roof ridge. In this embodiment, a modified clamping system design 70' is used. This modified clamping system generally corresponds to clamping system 70 except that base 74' and top member 82' are angled to produce the desired ridge slope.

Figure 6:
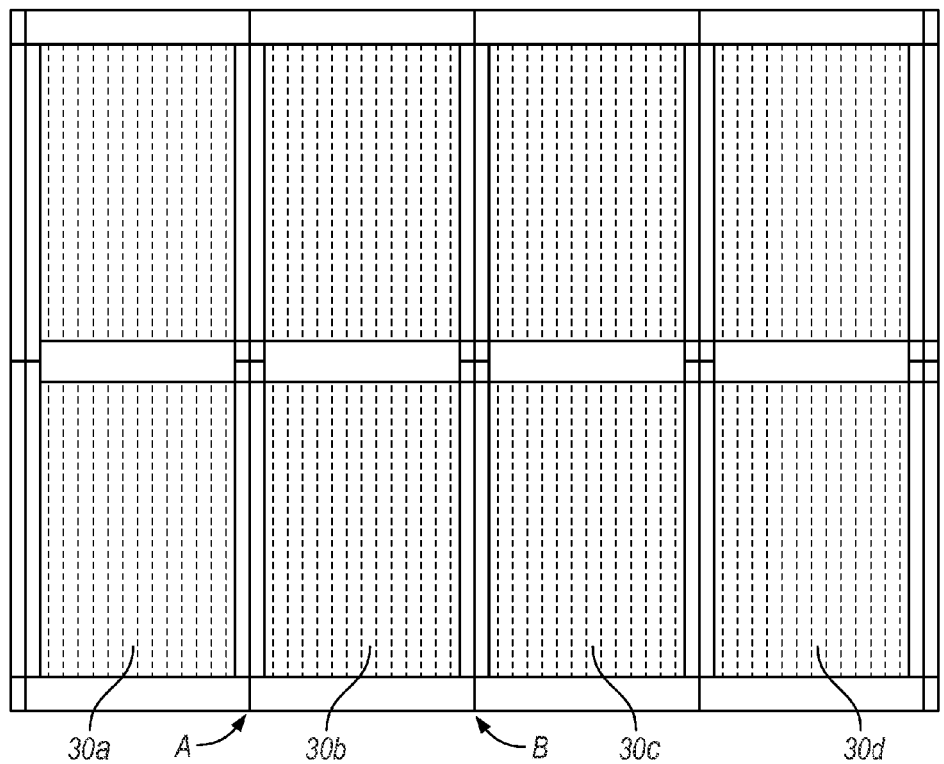
FIG. 6 is a plan view, of a portion of the structure illustrated in FIG. 4.
Figure 7:
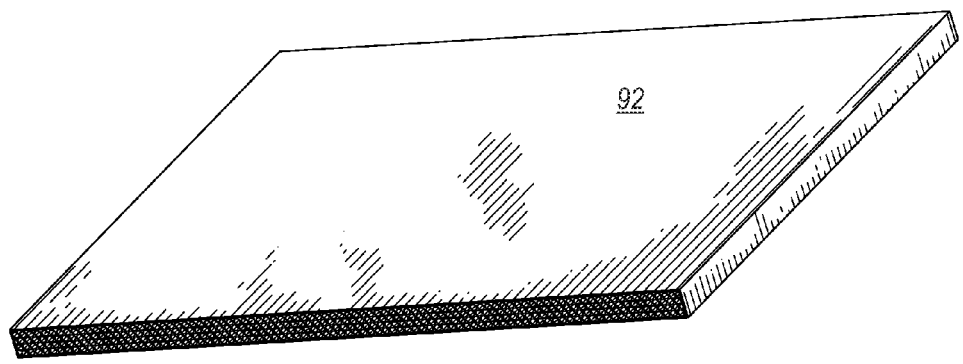
FIG. 7 is a perspective view of a honeycomb polycarbonate translucent panel which may be used in constructing a panel unit in accordance with the present invention.

A series of four panel units assembled to produce a panel system for use in a skylight is illustrated in FIG. 6. In this fully assembled system, the four panel units 30a, 30b, 30c, and 30d are each individually assembled and joined to adjacent panel units as illustrated in FIG. 2 and described above.

The use of removably mounted interior and exterior panels facilitates easy replacement of damaged panels without exposing the interior of the enclosed structure. Adding or replacing a double-layer on other glazing system, in contrast, would be significantly more difficult and expensive, and could produce damage requiring repairs that interrupt the function of the architectural structure in which the panel system is mounted.

Thus, assuming for purposes of illustration that exterior panel of panel unit 30b has to be removed to remedy a problem within the panel unit. This can be accomplished by inserting an appropriate tool at point A to remove the leading corner of the panel flange from its corresponding channel and then continue to zip it along the length of the panel to release the entire panel. This is repeated at point B whereupon the entire panel is removed, the problem is remedied and the exterior panel re-installed by positioning the flanges adjacent the channels and pressing the exterior panel home as describe earlier. It should be noted that this entire repair operation can be accomplished without disturbing the interior panel of the panel unit. Also, either of the sheets of the alternative panel-joining arrangement of FIG. 2B may be removed in a similar fashion by slipping the appropriate channel from the edge of the sheet which is to be removed and reattaching the channel when the repair is completed.

A wide variety of different types of panels made of various transparent and translucent materials may be used, including, but not limited to, plastics (including, but not limited to, polycarbonates and acrylics), fiberglass, perforated metal fabric, or glass. It is preferred, however, that the panels have at least the appropriate light transmitting properties and a minimum resistance to impact of about 10 ft/lb. Also, a UV-resistant architectural face can be co-extruded with the panel to minimize the need for periodic resurfacing.

In one preferred embodiment, a Pentaglas® honeycomb polycarbonate translucent panel available from CPI International Inc. (Lake Forest, Ill.) will be used. These polycarbonate panels are described in U.S. Pat. No. 5,895,701, which is incorporated herein by reference, have an integral extruded honeycomb structural core consisting of small honeycomb cells approximately 0.16 inch by 0.16 inch which provides internal flexibility to absorb expansion and minimize stress and resists impact buckling. The resulting design offers smaller spans between rib supports, resulting in stronger durability, as well as superior light quality, visual appeal, higher insulation and excellent UV resistance. The internal flexibility of the panels absorbs thermal expansion through the panel in all directions (on the x, y, and z axes). This minimizes stress in all directions and preserves dimensional stability. The panels also have a high impact absorbing and load bearing property, a good ratio of weight to strength, and UV protection on both sides of the panel. The superior light diffusion capabilities ensure excellent quality of natural light. The panels are environmentally friendly, non-toxic, and made of 100% recyclable material.

Figure 8:
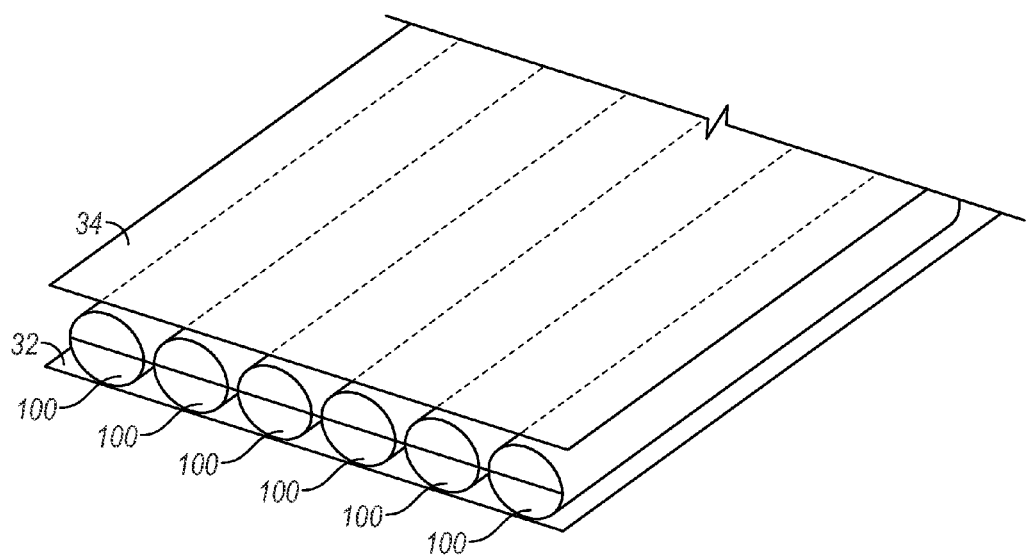
FIG. 8 is a diagrammatic perspective view of a series of abutting light-controlling members.

A series of elongated rotatably mounted light-controlling members 100 corresponding in length to the length of the panel units are disposed between panels 32 and 34, as represented in a diagrammatic perspective fashion in FIG. 8. As described below, the light-controlling members may be of a variety of different structures. In a preferred embodiment, the light-controlling members will have a circular outer rotation surface (e.g., an elongated tube or a series of outer annular members disposed along the light-controlling members generally perpendicularly to the longitudinal axes of the light-controlling members) extending at least about 180° around their circumference. In the illustrated embodiment, the light-controlling members abut each other (tolerance about 1-3 mm) to maximize the light blocking capability of the system. This one preferred embodiment of the invention. However, in alternative embodiments, the light-controlling members may be spaced from each other permitting some light to pass between adjacent light-controlling members. Also, in some alternative embodiments of the invention, there will be no contacting engagement surfaces of adjacent light-controlling members.

Figure 9:
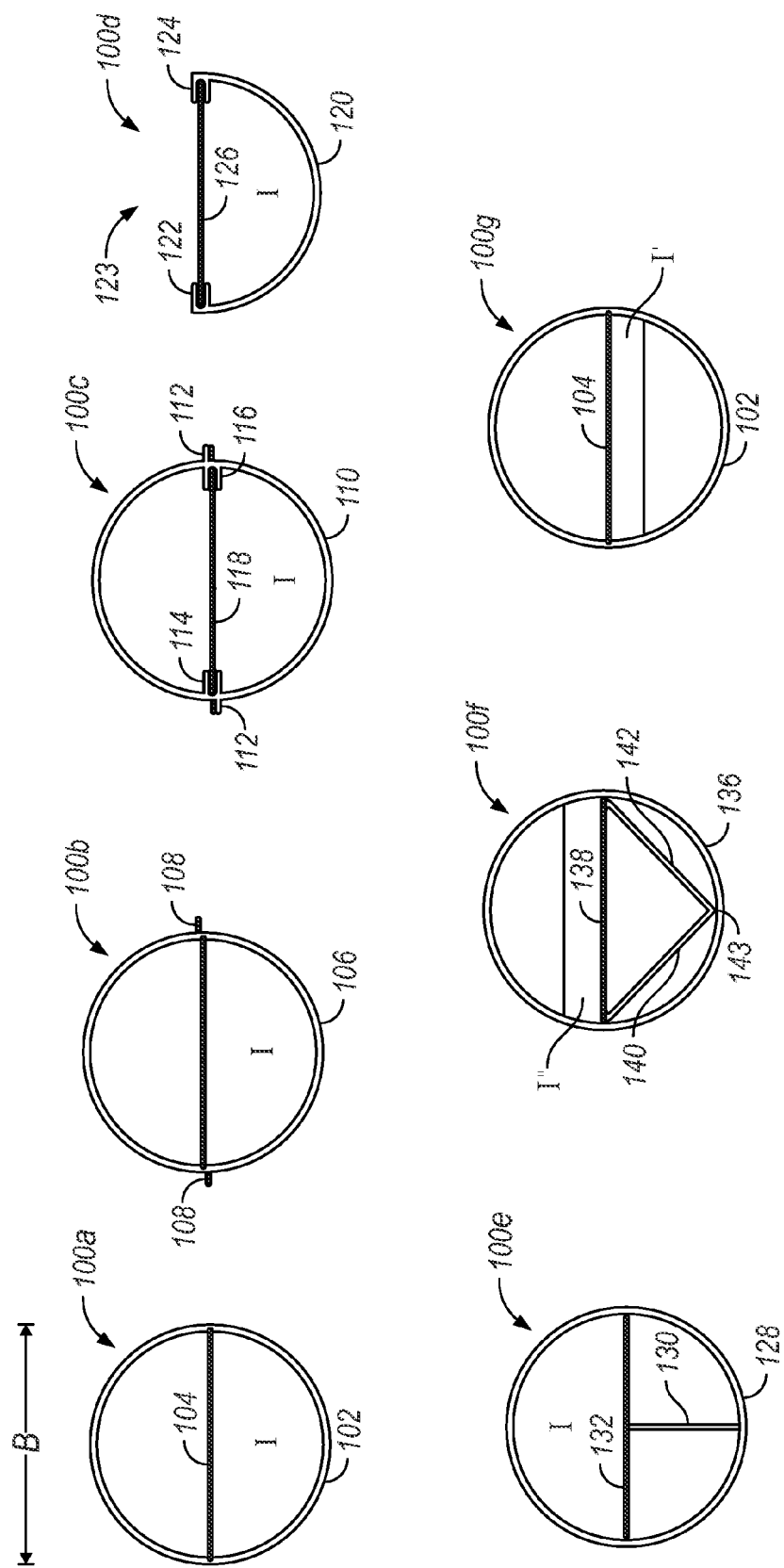
FIG. 9 is a series of alternative designs of light-controlling members which may be used in the present invention.

A series of alternative designs of the light-controlling members 100 are illustrated in cross-section in FIG. 9. For example, a light-controlling member 100*a* may be used, comprising a generally elongated transparent or translucent tube 102 having a diameter "B". A generally planar light-blocking or opaque member 104 is positioned in the tube across its diameter by co-extruding the outside tubular wall and the light-blocking or opaque member or by inserting the light-blocking or opaque member in a preformed tube.

Figure 9A:
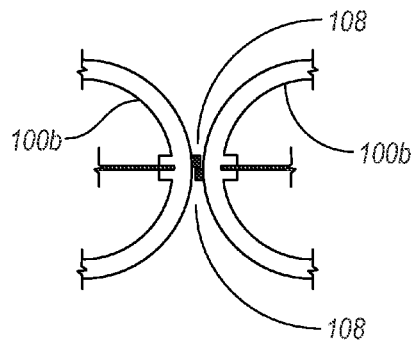
FIG. 9A is an enlarged partial view of a pair of particular light controlling members in abutting position.
Figure 9B:
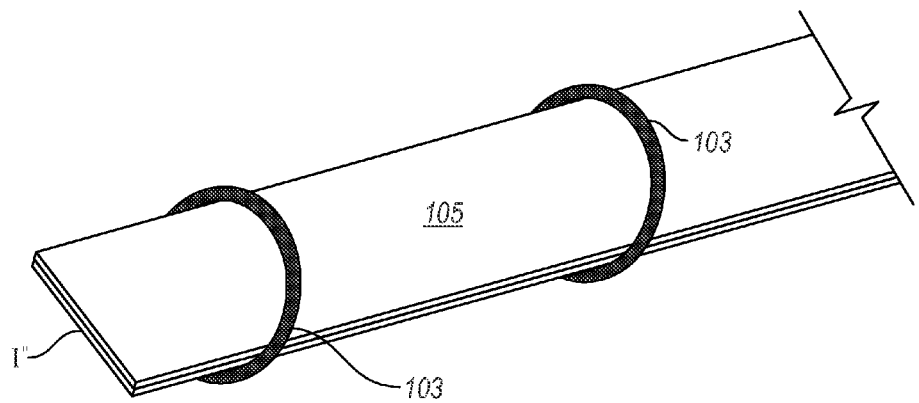
FIG. 9B is a partial view of a light-controlling member comprising a flat opaque member with a series of rings spaced along its length.

The light-blocking or opaque member need not be flat but may, for example, be wider than the allowed space and inserted in a "bowed" or other configuration. In the illustrated embodiment, tube 102 may be replaced by a series of annular members or rings 103 spaced along an opaque member 105 (FIG. 9B). In this embodiment, the opaque member should be sufficiently rigid so that applying rotary movement to the opaque member at any point along its length will cause the entire light-blocking or opaque member to rotate about its longitudinal axis without causing the opaque member to twist substantially out of its initial configuration.

The light-blocking members may be opaque or they may be translucent or tinted to a level which produces the desired degree of light-blocking. Also, the light-blocking members may be segmented into light-blocking or opaque portions and transparent/translucent portions. For example, in a 40-foot panel unit with corresponding 40-foot light-controlling members, the first 10 feet of one or more of each of the light-blocking members may be opaque, the next 5 feet transparent/translucent, and the last 25 feet opaque. Such a segmented arrangement might be used where it is desired to maintain a lighted area at all times.

Figure 9C:
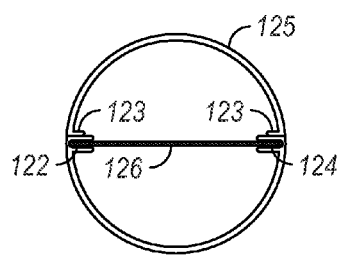
FIG. 9C is an alternate embodiment of a light-controlling member structure of FIG. 9 in which an opaque member is assembled into opposing slots of a hemispherical tube light-controlling member and then a second hemispherical tube is assembled to the first tube to form a complete tubular configuration.
Figure 9D:
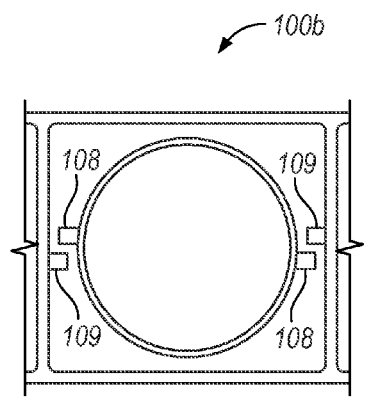
FIG. 9D is an enlarged partial view of a single light-controlling member in an elongated panel cell where the light-controlling member includes light-controlling sills that engage corresponding sills on the cell walls.

Light-controlling member 100*b* is generally of the same design as light-controlling member 100*a* including a tube 106, except that longitudinal sills 108 project radially from the outer surface of the tube. When the tubes are positioned so that the sills abut at least partially as the tubes rotate (FIG. 9A), the range of motion of the tubes is limited by the abutting sills to 180°. Also, the sills may be either opaque themselves (as shown) or coated with a light-blocking or opaque material. This provides enhanced light blocking when the sills approach and reach an abutting position since light between the tubes is blocked by the sills. Furthermore, the use of light-blocking or opaque sills in this fashion makes it possible to increase the spacing between the adjacent tubes without sacrificing light blocking between the tubes, so long as the sills are also widened to insure that they extend into the space between the adjacent tubes. Of course, tubes with light-blocking or opaque sills as described above may also be arranged so that the sills do not actually touch as the tubes rotate, which will permit some light to pass between the sills when the light-controlling members are in the closed position. Also, the tubes may be provided with only one light-blocking or opaque sill each or with more than two sills at varying locations about the circumference of the tubes. Lastly, it should be noted that panel 10 of the '255 patent may be provided with fixed sills 109 on the cell walls that abut sills 108 on the light-controlling member to limit the passage of light between the cell wall and the outer surface of the light-controlling members, as illustrated in FIG. 9D.

Light-controlling member 100*c* comprises a tube 110 with opaque-coated outer sills 112 and a pair of opposing slots 114 and 116 formed at the inside diameter of the tube to receive an opaque member 118 which is assembled into the tube after it is formed. In all cases, the opaque member is rendered opaque by known techniques, such as painting, by coating with an opaque film, by applying an opaque plastic layer by co-extrusion, etc. Also, fire resistant materials such as metal slots may be used as the opaque member to improve the fire resistance of the panel system. Additionally, different colors and designs may be applied to the opaque members to increase the visual interest of the panel system as the opaque members move into the closed position. Indeed, the opposite sides of individual opaque members may be differently colored or bear different designs to produce different visual effects by rotating the light-controlling members 180° from one fully closed position to the other.

Another light-controlling member design is designated 100*d*. This tube has a generally hemispherical cross-section and preferably its circumference extends to 180°. Although an opaque surface may be coextruded across the diameter of the tube (not shown), in the illustrated embodiment the tube 120 includes a pair of opposing slots 122 and 124 at the inside diameter of the tube to receive an opaque member 126 which is assembled into the tube after it is formed. When this structure is used, a series of annular members or rings may be disposed along the length of the light-controlling member to permit complete rotation of the light-controlling member. In another alternative embodiment, once the opaque member is assembled into opposing slots 122 and 124, another tube 125 with a generally hemispherical cross-section and lands 128 may be assembled to tube 120 (e.g., by creating an adhesive bond or a clip-on type connection at the lands) to produce a complete 360° tubular configuration as seen in FIG. 9C.

Light-controlling member 100*e* comprises an opaque member 132 with a supporting wall 130, together forming an elongated light-controlling member with a "T" shaped cross-section, as shown. The reinforcing rib 7 adds rigidity to the opaque member and also helps position the opaque member within a series of rings 128 which are spaced along the light-controlling member. In a less preferred embodiment of the invention, the reinforcing rib may be eliminated. Light-controlling member 100*f*, in turn, includes a series of annular members of rings 136 and an opaque member 138 with generally perpendicular supporting walls 140 and 142 which extend along the length of the tube and abut the rings at their apex 143. Other tube configurations are illustrated in U.S. Pat. No. 6,499,255, and are incorporated herein by reference.

Figure 10A:
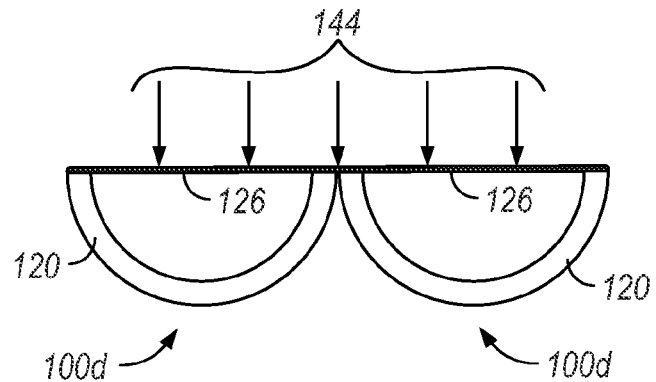
FIGS. 10A-10C are diagrammatic representations of two light-controlling members in three difference relative positions, showing the passage of varying amounts of light.
Figure 10B:
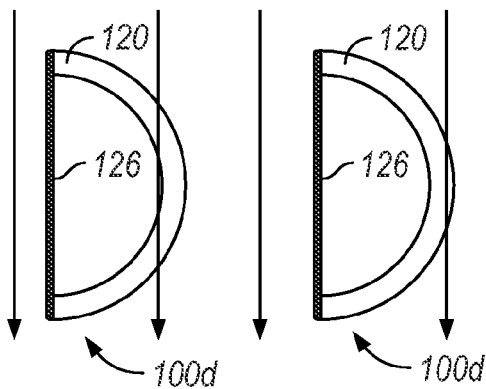
Figure 10C:
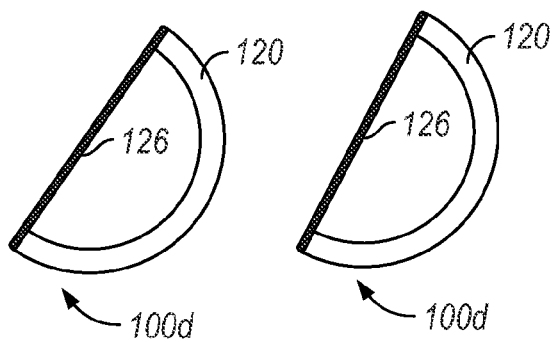

FIGS. 10A-10C are diagrammatic representations of two light-controlling members 100*d* in three different positions. In FIG. 10A, the two light-controlling members are in the "fully closed" position, with the opaque members 126 of the tubes 120 adjacent each other and fully blocking incoming light 144. This figure should be contrasted with the depiction of the prior art system of U.S. Pat. No. 6,499,255 in which in the fully closed position depicted, light rays 22 penetrate the panel through the walls 17 between the cells 16. In FIG. 10B, tubes 120 have been rotated 90° so that the maximum amount of light 144 may pass by the tubes. Finally, in an intermediate position of the tubes as shown in FIG. 10C, only a portion of the light will pass.

In each of the embodiments of this invention, the opaque members may be replaced with light-blocking members which are not opaque but rather are semi-opaque so that a limited amount of light will pass in the fully closed position, as may be required or desired in certain applications. Also, the opaque or semi-opaque members may include photovoltaic solar cells to generate electricity, preferably in conjunction with means for maximizing the photovoltaic output by rotating the light-controlling members with movement of the sun across the sky to insure that the photovoltaic solar cells continuously receive the maximum possible sunlight exposure. Finally, where the sole objective is to generate electricity, the opaque members may be replaced with transparent or translucent photovoltaic solar cells.

Figure 11:
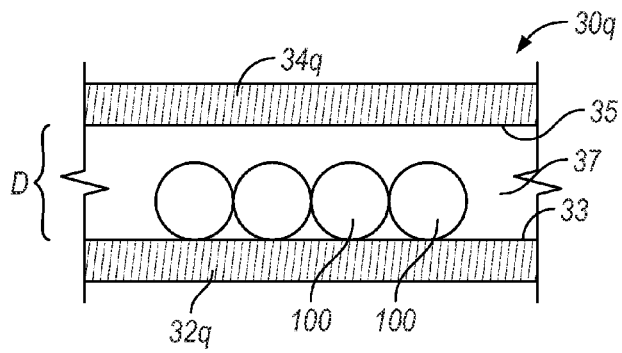
FIG. 11 is a diagrammatic front elevation representation of a panel unit in accordance with the present invention in which tubular light-controlling members rest directly on the bottom panel of the panel unit.

We turn now to FIG. 11 which illustrates, in diagrammatic form, a partial elevation view of a panel system unit 30*q* in accordance with the present invention including an interior (or bottom) panel 32*q* and an exterior (or top) panel 34*q* that are generally parallel to each other. A series of tubular light-controlling members 100 rest directly on the top surface 33 of interior panel 32*q*. The panels are made of transparent/translucent polycarbonate having a deflection factor d of 20 and the span of each of the panels is one meter. The maximum height of the elongated light-controlling tubes is 25 mm and f is 5 mm. Accordingly, applying the formula s/d+f+h<D, the bottom surface 35 of exterior panel 34*q* will be spaced a distance D of greater than 80 mm from the top surface 33 of the interior panel. The resulting air space may be filled with a non-combustible generally light-transmitting material such as a metal screen to enhance the fire-resistance of the panel system. Additionally, a light-transmitting fire-resistant insulating material, such as loose glass fibers, may be also disposed in the air space, either alone or in combination with the metal screen to improve both the insulating properties of the panel system and to enhance its fire-resistance.

Figure 12:
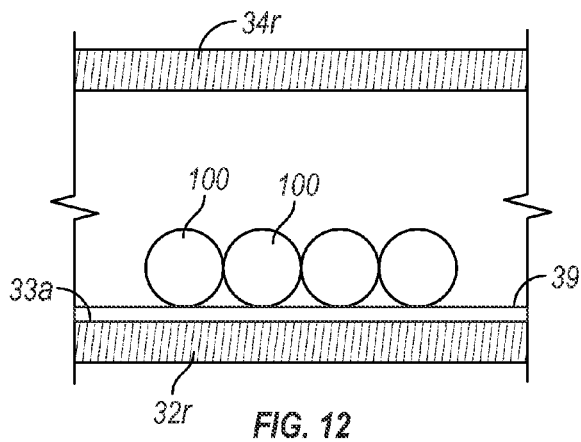
FIG. 12 is a diagrammatic front elevation representation of a panel unit in accordance with the present invention in which tubular light-controlling members rest on smooth-surfaced bottom cross-members resting on the bottom panel of the panel unit.
Figure 12A:
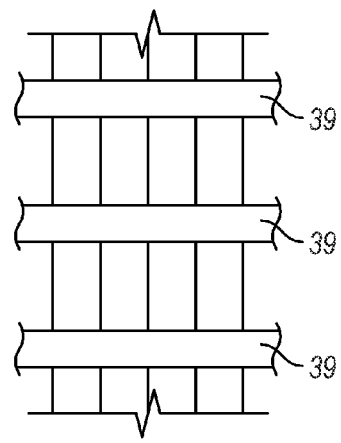
FIG. 12A is a diagrammatic plan view corresponding to that of FIG. 12.
Figure 15A:
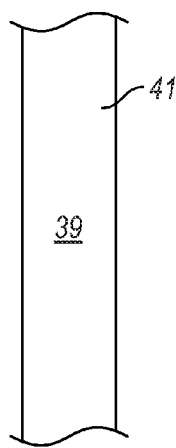
FIG. 15A-15D are representations of exemplary raised surface features on cross-members used in various embodiments of the invention.

In another alternative embodiment of the invention illustrated in FIG. 12, at least one (three are shown) generally parallel flexible cross-members 39 with generally flat top surfaces 41 (FIG. 15A) are positioned under the light-controlling members. These flexible cross members establish a spacing between the bottom edges of the light-controlling members and the top surface 33*a* of interior panel 32*r* to prevent damage to the panel surface and to minimize friction as the light-controlling members are rotated along their longitudinal axes to control the passage of light through the panel unit. The flexible cross-members may be spaced at intervals along the length of the light-controlling members, as illustrated in FIG. 12A. The spacing will depend on the dimensions and material of the panels and the light-controlling members. For example, with polycarbonate panels and 25 mm light-controlling members, spacing of the flexible cross-members at approximately one meter intervals has been found to be desirable to achieve the objectives of the invention.

The flexible cross-members may be made of any appropriate flexible material, although it is preferred that they be made of a low friction corrosion resistant material such a low friction engineered plastic like polycarbonate or a low friction metal like aluminum or stainless steel. It is preferred that the material be transparent/translucent to maximize light transmission across the panel unit when the light-controlling members are fully opened. However, when an opaque material is used, holes may be formed in the material to improve the light transmission across the cross-members. In a preferred embodiment, the flexible cross-members will have a flexure that will not interfere with movement of the panel unit.

Figure 15B:
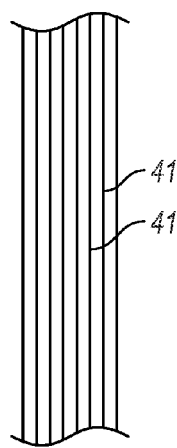
Figure 15C:
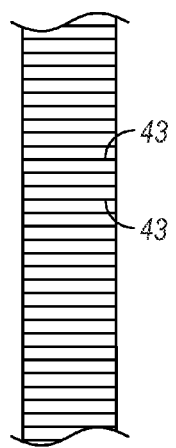
Figure 15D:
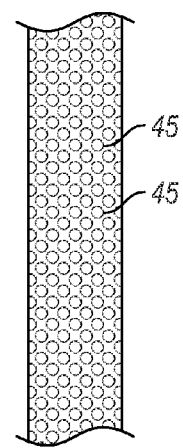

Preferably, flexible cross-members 39 will be of a width of about 10-20 mm and at least about 0.5 mm in thickness. Preferably, the flexible cross-members will be about 1-3 mm thick. For example, if a polycarbonate flexible cross-member is used, it may be 1 mm thick and 20 mm wide. Additionally, top surface 39 of the supporting members may be coated with a slippery coating such as polytetrafluoroethylene (Teflon®). Also, top surface 39 may contain raised surface features such as a series of ridges disposed longitudinally (FIG. 15B), a series of ridges disposed laterally (FIG. 15C) or ridges disposed otherwise as desired to minimize the area of contact between the support member and the light-controlling members. In yet another alternative embodiment (FIG. D), the raised surface features may comprise a series of rounded protuberances located on top surface 39 also to minimize friction.

Figure 13:
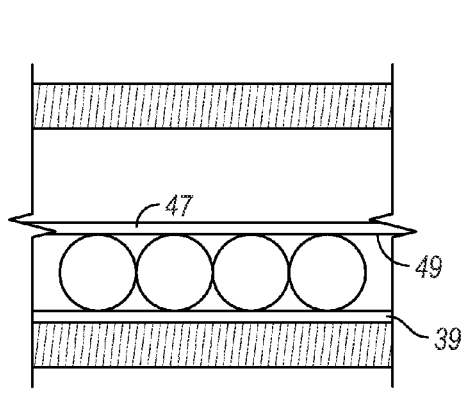
FIG. 13 is a diagrammatic front elevation representation of a panel unit in accordance with the present invention in which tubular light-controlling members rest in which both bottom and top smooth-surfaces cross-members are provided.
Figure 13A:
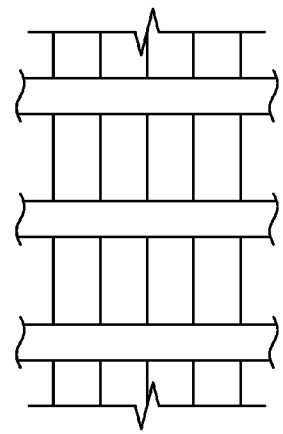
FIG. 13A is a top plan diagrammatic representation corresponding to that of FIG. 13.

Turning now to FIGS. 13 and 13A, another alternative embodiment of the invention is shown wherein the structural arrangement of FIG. 12 is modified to include at least one top cross-member 47 with a generally flat bottom surface 49 positioned to lie across the light-controlling members. This top cross member may be made of the same materials and configured as described above with respect to bottom cross-member 39 where surface 49 of cross-member 47 is taken to correspond to surface 39 of cross-member 41. It is also further preferred that the number of top cross-members correspond to the number of bottom cross-members and that the top and bottom cross-members be positioned opposite each other. Top cross-member(s) 47 will help maintain the light-controlling members in position while minimizing rattling due to oscillatory and other movement of the light-controlling members.

Figure 14:
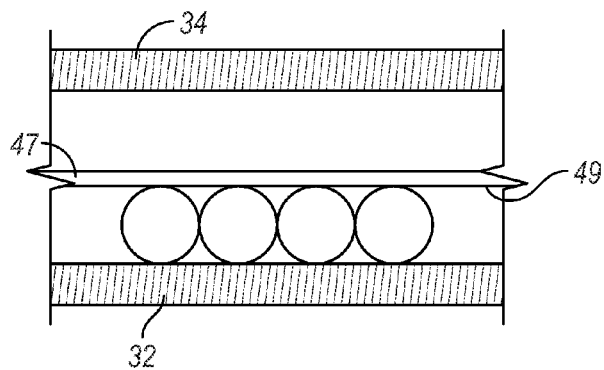
FIG. 14 is a diagrammatic front elevation representation of a panel unit in accordance with the present invention in which tubular light-controlling members rest directly on the bottom panel of the panel unit and top smooth-surfaced cross-members are also provided.

FIG. 14 illustrates yet another alternative embodiment of the invention in which top cross-members 47 are used without bottom cross-members.

Figure 16A:
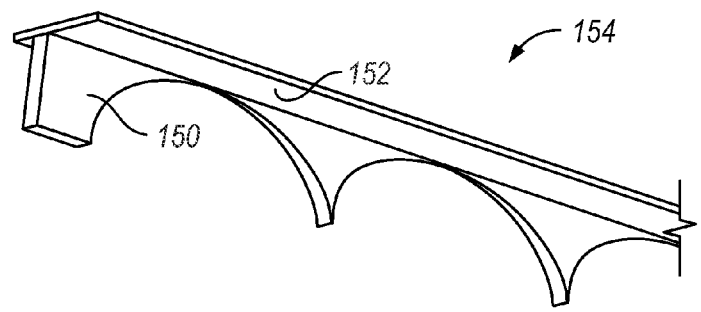
FIG. 16 is a partial enlarged perspective view of a scalloped carrier member.
Figure 16B:
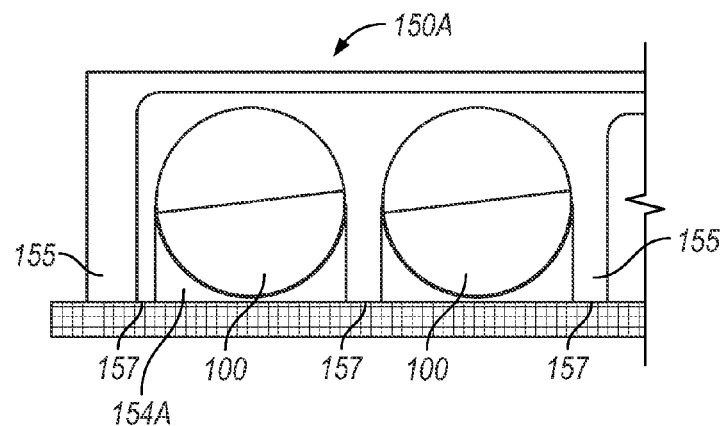
Figure 17:
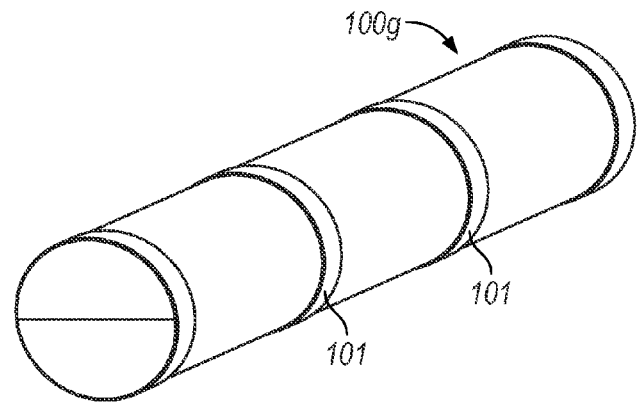
FIG. 17 is a perspective view of a light-controlling member with a series of slippery non-abrasive bands.

In a further alternative embodiment of the invention, top cross-members 47 of FIG. 13 or 14 may be replaced by top scalloped carriage members 150 (FIG. 16A) each comprising a generally horizontal base top 152 in a series of hemispherical cutouts or scallops 154 in the top surface. Scallops 154 are intended to receive the light-controlling members and may be slightly greater in diameter than the light-controlling members. A modified top scallop member 150A (FIG. 16B) may be used with elongated scallops 154A that encompass the entire light-controlling member 100 and rest at the end 157 of each scallop divider 155 on the top surface of the lower panel (which may in turn be provided with means for minimizing friction and abrasion as described herein).

Figure 18A:
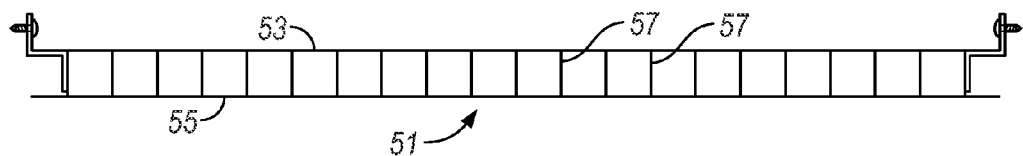
FIGS. 18A and 18B are, respectively, diagrammatic front elevation and bottom plan views of flexible upstanding support members with a series of apertures perpendicular to the axes of the light-controlling members to be received in the apertures
Figure 18B:
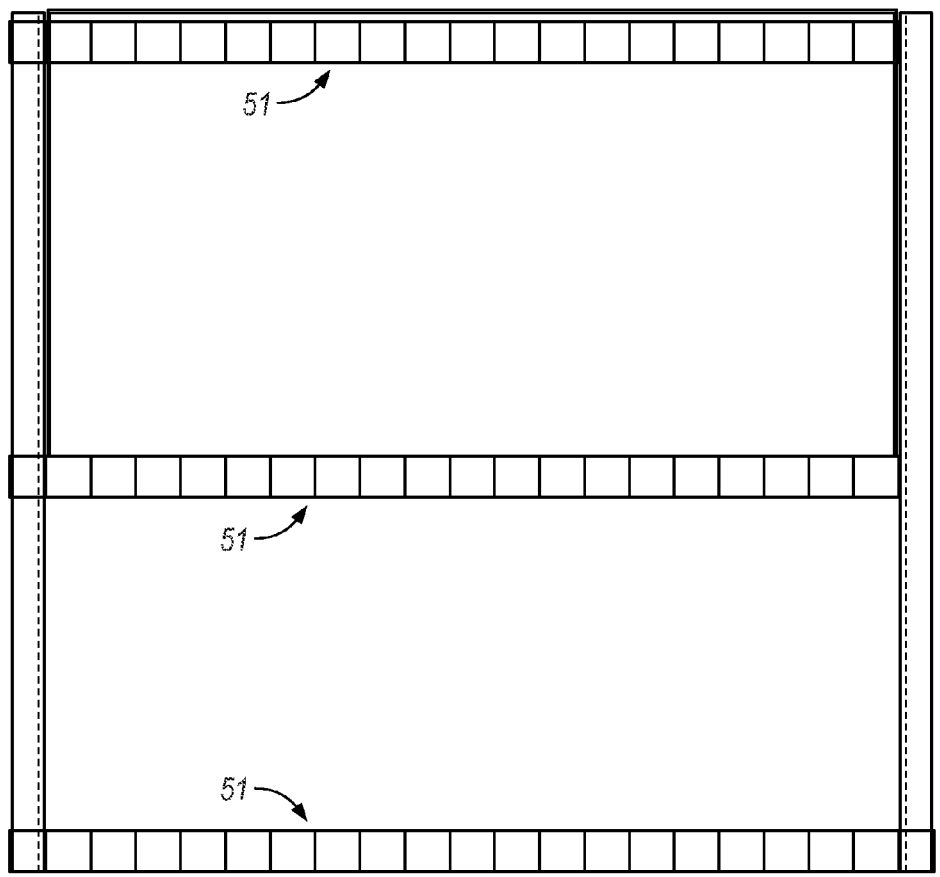
Figure 18C:
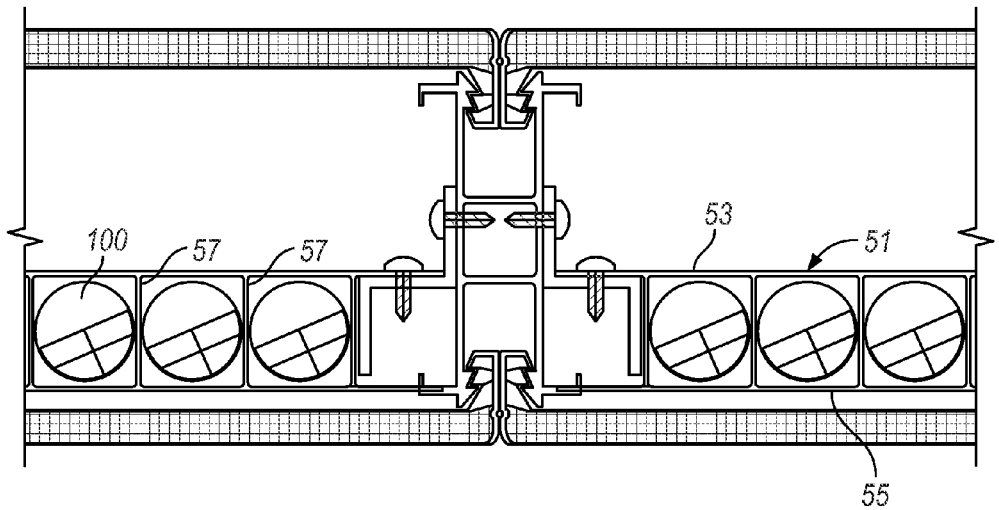
FIG. 18C is a partial front elevation view of the flexible upstanding support members mounted to a panel unit with light-controlling members in place.

In yet another alternative embodiment of the invention, illustrated in FIGS. 18, 18A and 18B, top and bottom support members 39 and 47 will be replaced by at least one upstanding flexible support member 51 (three are shown) comprising generally parallel top and bottom members 53 and 55 joined by outstanding dividers 57 which form a series of apertures generally perpendicular to the longitudinal axes of the light-controlling members for receiving individual light-controlling members. The upstanding flexible cross-members may be made of any of the materials suggested above for flat cross-members 39 and preferably will be made of transparent/translucent polycarbonate. It is preferred that the flexible upstanding support members be sufficiently flexible to move with the panel system as it is deflected, etc. It is also preferred that the flexible upstanding cross-members not be fixed to the panels so that the cross-members may expand, contract, and move free of influence by expansion, contraction and flexure/deflection due to varying loads to which the panel unit is subjected. Suitable flexible cross-members may be produced, e.g., by cutting strips (e.g., 10-20 mm wide) out of extruded twin wall plastic panels having adjacent segregated elongated cells like those of panel 10 of FIG. 1. Such strips can flex under load and provide the required functionality.

Figure 19:
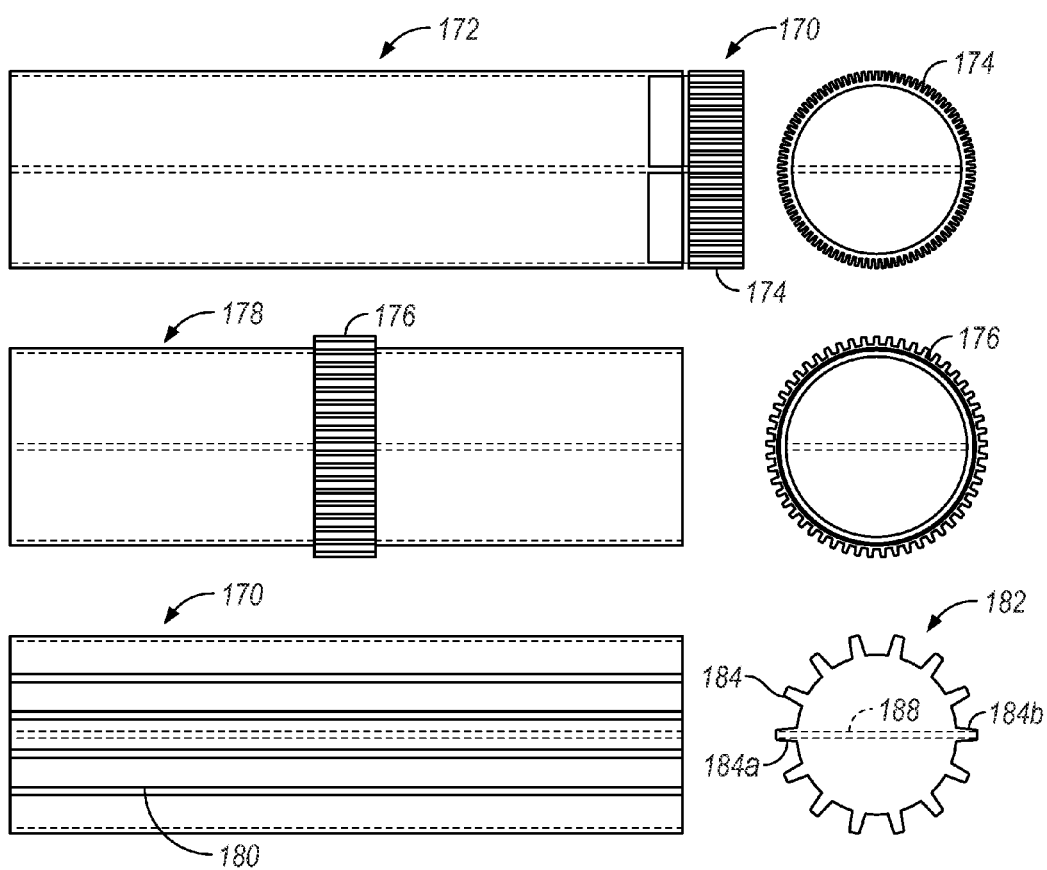

Turning now to FIG. 19, three alternative means for transmitting motion across adjacent light-controlling members are illustrated. In the first motion-transmitting arrangement, an annular endcap 170 is attached to one end of a light-controlling member 172 and the endcap is provided with a band 174 of a high coefficient of friction material, such as rubber or polyurethane, so that circular motion imparted to one light-controlling member in the series of adjacent members will impart motion to the remaining members due to the frictional linkage achieved by the high coefficient of friction material positioned in alignment on adjacent members. One or more bands 174 may also be applied along the light-controlling members when they are tubular, either in lieu of the band on endcap 170 or in addition to it. Also, it is preferred that the bands be clear or translucent, particularly when they are disposed along the light-controlling members. Additionally, where the light-controlling members have sills, as discussed above, the sills will be cut away to provide clearance for the rings.

In the second motion-transmitting arrangement, one or more notched bands 176 are positioned along a light-controlling member 178 and aligned so that the intermeshed bands of adjacent light-controlling members transmit motion imparted to one member across the series of intermeshed members. Such intermeshing bands may also be used on an endcap as described above and further use of clear or translucent intermeshing bands is preferred. Also, as in the prior embodiment, where the light-controlling members have sills as discussed above, the sills will be cut away to provide clearance for the rings.

In the third motion-transmitting arrangement, the outer surface 182 of each of light-transmitting members 180 is provided (as by extruding) with a cogwheel cross-section, as shown, including a series of teeth 184 extending along their length so that the adjacent light-transmitting members intermesh to transmit motion imparted to one member (as by a drive motor (not shown)) across the series of intermeshed members. An opaque member 188 is preferably positioned within the cogwheel cross-section between a diametrically opposing pair of teeth 184*a* and 184*b* so that the opaque member extends into the teeth and is supported along its lateral edges within the opposing teeth. This embodiment has some significant advantages. First, the intermeshing teeth provide a wide tolerance as to fit between adjacent light-controlling members and tolerance to dirt or other extraneous matter which may find its way into the area. Second, since the opaque member extends into the teeth and is supported along its lateral edges within the opposing teeth in the closed position, the opaque members of adjacent light-controlling members will overlap, blocking the passage of light between adjacent light-controlling members.

End views of the light-transmitting members resting within a series of three panel systems, 186, 188 and 190 as described above are illustrated in FIG. 20. In panel system 188, however, a small gear 192 is located between the adjacent spaced light-controlling members to enable the light-controlling members to rotate in the same direction as the adjacent notched bands intermesh with the wheels.

The above and other methods may be used for rotating adjacent light-controlling members where rotary motion is imparted to one or more (but not all) of the adjacent light-controlling members either manually or by motorized means, as represented diagrammatically by feature M in FIG. 12A. Any of the mechanisms described in U.S. Pat. No. 6,499,255, for example, may be used for imparting such rotary motion.

Figure 21A:
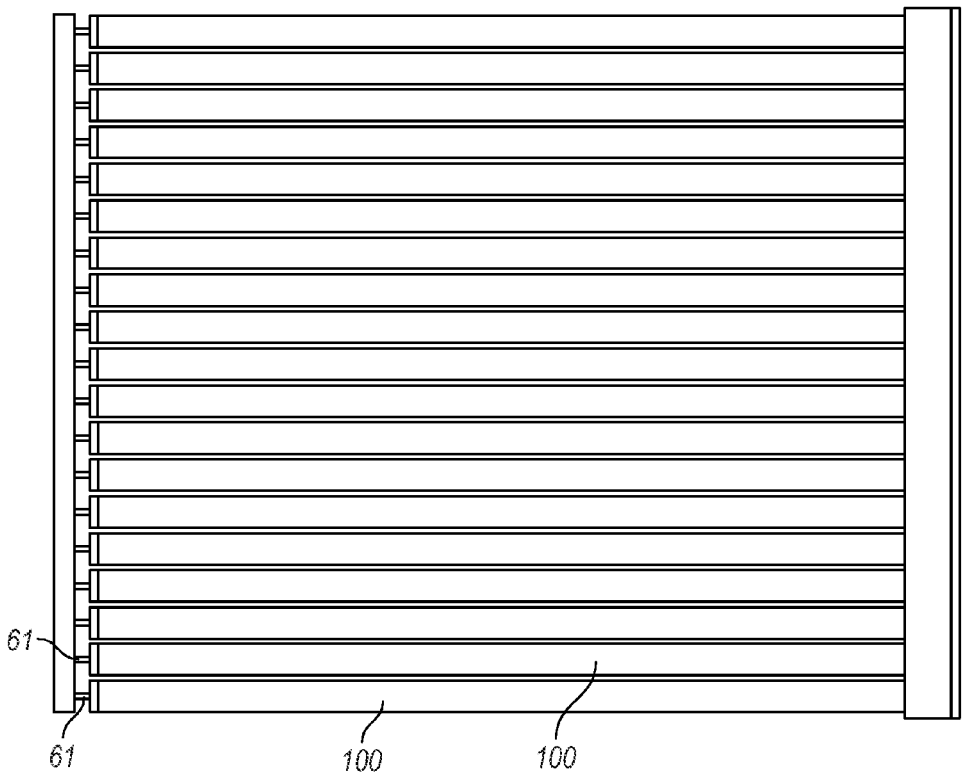
FIGS. 21A and 21B are top plan and side elevation views of structures for maintaining and driving a series of light-controlling members between panels of a panel unit.
Figure 21B:
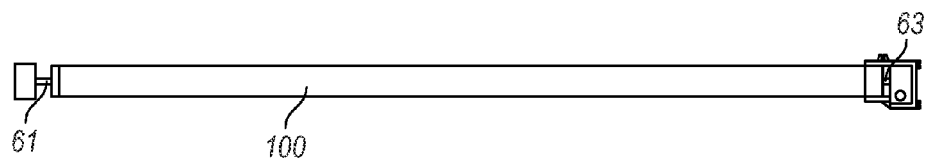

Finally, FIGS. 21A and 21B illustrate one possible mounting of a series of elongated light-controlling members 100 on a series of centered free-spinning pivot pins 61 at one end and centered drive pins 63 at the other end that rotate the controlling members as desired to control light passage across a panel unit. If the span of the panel unit (and hence the light-controlling members in it) is sufficiently small (e.g., about 65 cm-130 cm), this structure may be used without flexible cross-members because no significant flexure of the panel unit under load will be expected at such a limited span.

Finally, the embodiments of the invention described above in which flexible cross-members are positioned below the light-controlling members may be modified by applying a transparent/translucent slippery coating to the surface of the top lower panel. One such coating is a silicone lubricant coating which may be applied by spraying. In this embodiment, top flexible cross-members may be used to help minimize rattling of the light-controlling members. Also, bottom flexible cross-members may also be used to enhance the low friction and low-abrasion effects.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A light-controlling transparent/translucent panel unit able to perform under load having a span s comprising:
   a pair of generally parallel transparent/translucent panels spaced apart a distance D mm and made of material having a deflection factor d;
   a plurality of light-controlling members with a maximum height h mm positioned between the panels,
   the light-controlling members having at least one substantially light-blocking surface;
   a plurality of flexible support members positioned between the generally parallel transparent/translucent panels and disposed perpendicularly to the axes of the light-controlling members, the flexible support members being spaced at intervals along the length of the light-controlling members; and
   the material of the panels chosen to have a deflection factor d, the span of the panel unit chosen to have a span of s mm, the light-controlling members chosen to have a height of no greater than h mm, and the panels of the panel unit spaced apart a distance of D mm to ensure that when the sum of $s/d+h+f$ is taken the sum is less than D mm, where f is a deflection factor; and
   means for imparting rotary motion to the light-controlling members about their longitudinal axes to vary the level of light passing through the panel unit.

2. The light-controlling transparent/translucent panel unit of claim 1 in which the panels are made from a material chosen from the group consisting of plastic, fiberglass, perforated metal, fabric, and glass.

3. The light-controlling transparent/translucent panel unit of claim 1 in which the panels are chosen from the group consisting of honeycomb cross-section polycarbonate translucent panels and rectangular cross-section polycarbonate translucent panels.

4. The light-controlling transparent/translucent panel unit of claim 1 in which the light-controlling members are positioned in abutting relationship and include contacting engagement surfaces.

5. The light-controlling transparent/translucent panel unit of claim 1 in which the light-controlling members are elongated tubes having an outer circular surface extending at least about 180° about the members.

6. The light-controlling transparent/translucent panel unit of claim 5 in which a plurality of rings are spaced along the outer circular surface of the tubes generally perpendicularly to the longitudinal axes of the tubes to enable rotation of the light-controlling member through 360°.

7. The light-controlling transparent/translucent panel unit of claim 1 in which the light-controlling members are tubular and include longitudinal sills projecting radially from the outer surface of the tubes.

8. The light-controlling transparent/translucent panel unit of claim 1 in which the light-blocking surfaces include photovoltaic solar cells.

9. The light-controlling transparent/translucent panel unit of claim 1 including an air space between the top edges of the light-controlling members and the panel above, and a light-transmitting fire resistant material is disposed within the air space.

10. The light-controlling transparent/translucent panel of claim 1 including at least one longitudinally spaced generally parallel bottom cross-member with a generally flat top surface positioned under the light-controlling members.

11. The light-controlling transparent/translucent panel unit of claim 1 in which the members have a series of apertures generally perpendicular to the longitudinal axes of the light-controlling members for receiving individual light-controlling members and the light-controlling members being positioned therein.

12. The light-controlling transparent/translucent panel unit of claim 1 in which the support members are transparent or translucent.

13. The light-controlling transparent/translucent panel unit of claim 1 in which f is about 1-20 mm.

14. A light-controlling transparent/translucent panel unit able to perform under load having a span s comprising:
    a pair of generally parallel transparent/translucent panels spaced apart a distance D mm and made of material having a deflection factor d;
    a plurality of tubular light-controlling members with a maximum height h mm positioned between the panels positioned between the panels,
    the light-controlling members having at least one substantially light-blocking surface;
    a plurality of flexible support members positioned between the generally parallel transparent/translucent panels and disposed perpendicularly to the axes of the light-controlling members, the flexible support members being spaced at intervals along the length of the light-controlling members and having a series of apertures generally perpendicular to the longitudinal axes of the light-controlling members;
    the material of the panels chosen to have a deflection factor d, the span of the panel unit chosen to have a span of s mm, the light-controlling members chosen to have a height of no greater than h mm, and the panels of the panel unit spaced apart a distance of D mm to ensure that when under load the sum of $s/d+h+f$ is taken the sum is less than D mm, where f is a deflection factor; and
    means for imparting rotary motion the light-controlling members about their longitudinal axes to vary the level of light passing through the panel unit.

15. The light-controlling transparent/translucent panel unit of claim 14 in which the series of apertures comprise a series of scallops in the flexible support members for receiving individual light-controlling members.

16. The light-controlling transparent/translucent panel unit of claim 14 in which the upstanding support members are made from plastic.

17. The light-controlling transparent/translucent panel unit of claim 14 in which the support members are transparent or translucent.

18. The light-controlling transparent/translucent panel unit of claim 14 in which f is about 1-20 mm.

* * * * *